United States Patent
Zhu et al.

(10) Patent No.: US 10,778,401 B2
(45) Date of Patent: Sep. 15, 2020

(54) TIME DIVISION MULTIPLEXING (TDM) COORDINATION FOR MULTIPLE RADIO ACCESS TECHNOLOGY (RAT) CARRIER AGGREGATION

(71) Applicant: QUALCOMM Incorporated, San Diego, CA (US)

(72) Inventors: Xipeng Zhu, San Diego, CA (US); Seyedkianoush Hosseini, San Diego, CA (US); Xiao Feng Wang, San Diego, CA (US); Wanshi Chen, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/365,576

(22) Filed: Mar. 26, 2019

(65) Prior Publication Data

US 2019/0305915 A1 Oct. 3, 2019

Related U.S. Application Data

(60) Provisional application No. 62/651,341, filed on Apr. 2, 2018.

(51) Int. Cl.
*H04L 5/00* (2006.01)
*H04W 16/14* (2009.01)
(Continued)

(52) U.S. Cl.
CPC ............. *H04L 5/0083* (2013.01); *H04J 3/22* (2013.01); *H04L 5/023* (2013.01); *H04L 5/22* (2013.01); *H04W 16/14* (2013.01)

(58) Field of Classification Search
None
See application file for complete search history.

(56) References Cited

U.S. PATENT DOCUMENTS

2018/0294942 A1* 10/2018 Byun .................... H04L 5/1469
2019/0116592 A1* 4/2019 Moon ................... H04L 5/0092

OTHER PUBLICATIONS

AT&T: "Signaling support for LTE-NR Coexistence in Overlapping and Adjacent Spectrum", 3GPP Draft; R3-180499, 3rd Generation Partnership Project (3GPP), Mobile Competence Centre ; 650, Route Des Lucioles; F-06921 Sophia-Antipolis Cedex; France, vol. RAN WG3, No. Sophia-Antipolis, France; Jan. 22, 2018-Jan. 26, 2018 Jan. 12, 2018 (Jan. 12, 2018), XP051387480, Retrieved from the Internet: URL:http://www.3gpp.org/ftp/tsg%5Fran/WG3%5Fiu/TSGR3%5FAHGs/R3%2DAH%2D1801/Docs/ [retrieved on Jan. 12, 2018], 4 pages.

(Continued)

*Primary Examiner* — Anh Ngoc M Nguyen
(74) *Attorney, Agent, or Firm* — Patterson + Sheridan, LLP

(57) ABSTRACT

Certain aspects of the present disclosure provide techniques for multiple radio access technology (RAT) carrier aggregation (CA), such as Long Term Evolution (LTE)-New Radio (NR) CA. The method, in one example, comprises generating a first resource coordination information (RCI) comprising one or more resource coordination bitmaps indicating one or more shortened transmission time intervals (sTTIs) of a TTI assigned to the first RAT for communication, wherein the TTI comprises a plurality of sTTIs. The method further comprises transmitting a message including the first RCI to a second base station that uses a second RAT. The method further comprises receiving an acknowledgement of the message from the second base station, the acknowledgment including a second RCI comprising one or more modified resource coordination bitmaps indicating the one or more sTTIs assigned to the first RAT for communication and one or more additional sTTIs of the TTI assigned to the second RAT.

29 Claims, 12 Drawing Sheets

(51) Int. Cl.
*H04J 3/22* (2006.01)
*H04L 5/02* (2006.01)
*H04L 5/22* (2006.01)

(56) References Cited

OTHER PUBLICATIONS

Ericsson et al., "E-UTRA-NR Resource Allocation Coordination over X2", 3GPP Draft; R3-181570, 3rd Generation Partnership Project (3GPP), Mobile Competence Centre ; 650, Route Des Lucioles; F-06921 Sophia-Antipolis Cedex; France, vol. RAN WG3, No. Athens, Greece; Feb. 26, 2018-Mar. 2, 2018 Mar. 2, 2018, XP051393709, Retrieved from the Internet: URL:http://www.3gpp.org/ftp/Meetings%5F3GPP%5FSYNC/RAN3/Docs/ [retrieved on Mar. 2, 2018], 18 pages.
International Search Report and Written Opinion—PCT/US2019/024391—ISA/EPO—dated Aug. 5, 2019.
NEC: "NR Frequency and Time Resource Granularity", 3GPP Draft; R3-180297, 3rd Generation Partnership Project (3GPP), Mobile Competence Centre ; 650, Route Des Lucioles; F-06921 Sophia-Antipolis Cedex; France, vol. RAN WG3, No. Sophia Antipolis, France; Jan. 22, 2018-Jan. 26, 2018 Jan. 13, 2018, XP051387536, Retrieved from the Internet: URL:http://www.3gpp.org/ftp/tsg%5Fran/WG3%5Fiu/TSGR3%5FAHGs/R3%2DAH%2D1801/Docs/ [retrieved on Jan. 13, 2018], 2 pages.

* cited by examiner

| DL-reference UL/DL Configuration | 0 | 1 | 2 | 3 | 4 | 5 | 6 | 7 | 8 | 9 |
|---|---|---|---|---|---|---|---|---|---|---|
| 0 | - | - | 6, 5 | 5, 4 | 4 | - | - | 6, 5 | 5, 4 | 4 |
| 1 | - | - | 7, 6 | 6, 5, 4 | - | - | - | 7, 6 | 6, 5, 4 | - |
| 2 | - | - | 8, 7, 6, 5, 4 | - | - | - | - | 8, 7, 6, 5, 4 | - | - |
| 3 | - | - | 11, 10, 9, 8, 7, 6 | 6, 5 | 5, 4 | - | - | - | - | - |
| 4 | - | - | 12, 11, 10, 9, 8, 7 | 7, 6, 5, 4 | - | - | - | - | - | - |
| 5 | - | - | 13, 12, 11, 10, 9, 8, 7, 6, 5, 4 | - | - | - | - | - | - | - |
| 6 | - | - | 8, 7 | 7, 6 | 6, 5 | - | - | 7 | 7, 6, 5 | - |

| IE/Group Name | Presence | Range | IE Type and Reference | Semantics Description |
|---|---|---|---|---|
| EUTRA Cell ID | M | | ECGI 9.2.14 | |
| TTI Type | O | | ENUMERATED (sTTI_CFI1, sTTI_CFI2, sTTI_CFI3, slot, subframe) | |
| UL Coordination Information | M | | BIT STRING (6..8800,...) | Each position in the bitmap represents a PRB in a TTI as indicated by TTI type; value "0" indicates "resource not intended to be used for transmission", value "1" indicates "resource intended to be used for transmission". Each position is applicable only in positions corresponding to UL TTIs. The bit string may span across multiple contiguous TTIs (maximum 80). The first position of the UL Coordination Information corresponds to subframe 0 in a radio frame where $SFN = 0$. The length of the bit string is an integer multiple of $N_{RB}^{UL}$. $N_{RB}^{UL}$ is defined in TS 36.211 [10]. The UL Coordination Information is continuously repeated. |
| DL Coordination Information | O | | BIT STRING (6..8800,...) | Each position in the bitmap represents a PRB in a TTI as indicated by TTI type; value "0" indicates "resource not intended to be used for transmission", value "1" indicates "resource intended to be used for transmission". Each position is applicable only in positions corresponding to DL TTIs. The bit string may span across multiple contiguous TTIs (maximum 80). The first position of the DL Coordination Information corresponds to the receiving node's subframe 0 in a receiving node's radio frame where $SFN = 0$. The length of the bit string is an integer multiple of $N_{RB}^{DL}$. $N_{RB}^{DL}$ is defined in TS 36.211 [10]. The DL Coordination Information is continuously repeated. |

FIG. 10

| MeNB Resource Coordination Information | | 0..1 | | Information used to coordinate resources utilization between MeNB and SgNB | EACH | Ignore |
|---|---|---|---|---|---|---|
| >UL sTTI Pattern | O | | BIT STRING(80) | | - | - |
| >DL sTTI Pattern | O | | BIT STRING(80) | | - | - |
| >LTE sTTI PRBs | O | | BIT STRING(80) | | - | - |

TIME DIVISION MULTIPLEXING (TDM) COORDINATION FOR MULTIPLE RADIO ACCESS TECHNOLOGY (RAT) CARRIER AGGREGATION

CROSS-REFERENCE TO RELATED APPLICATION(S)

This application claims the benefit of and priority to U.S. Provisional Patent Application Ser. No. 62/651,341, filed Apr. 2, 2018, herein incorporated by reference in its entirety as if fully set forth below and for all applicable purposes.

BACKGROUND

Field of the Disclosure

Aspects of the present disclosure relate to wireless communications, and more particularly, to techniques for time division multiplexing (TDM) coordination for multiple radio access technology (RAT) carrier aggregation (CA), such as Long Term Evolution (LTE)-New Radio (NR) CA.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a first base station that uses a first radio access technology (RAT). The method generally includes generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs. The method also includes transmitting a message including the first resource coordination information to a second base station that uses a second RAT. The method further includes receiving an acknowledgement of the message from the second base station, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

Aspects of the present disclosure also provide a processor and a memory, wherein the memory includes a program executable in the processor to cause the first apparatus which uses a first radio access technology (RAT) to perform operations comprising generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs. The operations further comprise transmitting a message including the first resource coordination information to a second apparatus that uses a second RAT. The operations further comprise receiving an acknowledgement of the message from the second apparatus, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

Aspects of the present disclosure also provide a first apparatus comprising means for generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs. The first apparatus further comprises means for transmitting a message including the first resource coordination information to a second apparatus that uses a second RAT. The first apparatus further comprises means for receiving an acknowledgement of the message from the second apparatus, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 illustrates an example table including a number of downlink-reference uplink/downlink user equipment configurations, according to aspects of the present disclosure.

FIG. 10 illustrates an example table comprising a number of fields representative of the type of information included in a Resource Coordination IE (information element) that comprises a TTI type, according to aspects of the present disclosure.

FIG. 11 illustrates separate TDM (time division multiplexing) and FDM (frequency division multiplexing) IEs that may be included in, for example, the Resource Coordination Information, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
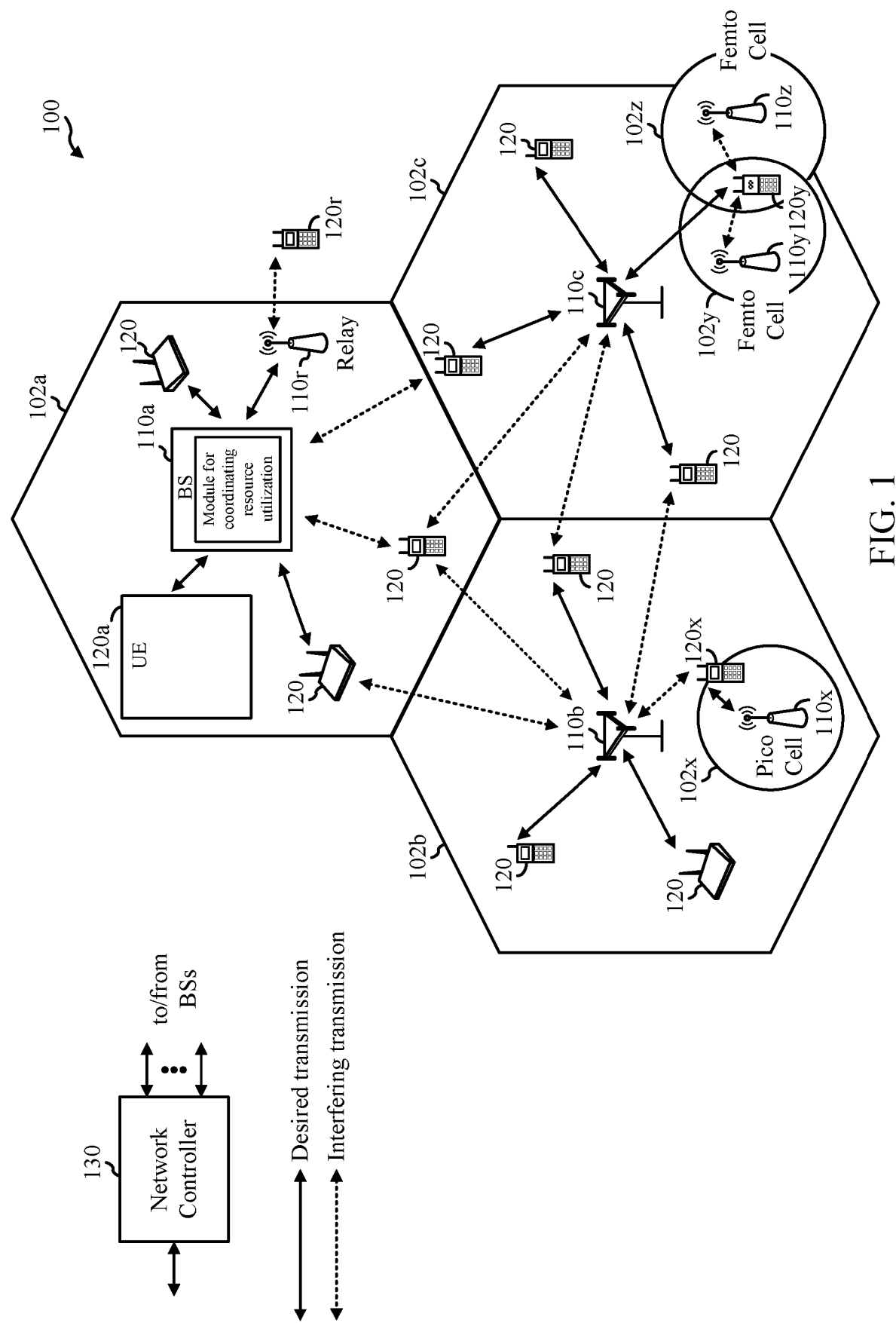
FIG. 1 is a block diagram conceptually illustrating an example telecommunications system, in accordance with certain aspects of the present disclosure.

Aspects of the present disclosure provide apparatus, methods, processing systems, and computer readable mediums for enabling a base station (BS), which uses one RAT (e.g., LTE) to coordinate resource utilization with another BS, which uses another RAT (e.g., NR), for communication with a user equipment (UE).

In certain cases, a BS may transmit and/or receive signals to a UE on multiple carriers, which may be referred to as component carriers (CCs), using carrier aggregation (CA). In some cases, the concurrent communication of the UE with LTE and NR base stations, however, may create interference, even when separate CCs are used for each RAT. Certain techniques may be used to reduce this interference by allowing BSs using different RATs to coordinate their resource utilizations in the time and frequency domains for communication with a UE. To coordinate resource utilization among each other, two BSs using different RATs may be configured to utilize resource coordination information that the two BSs may exchange.

For example, a main BS, such as a main eNB (MeNB) using LTE, may generate a "MeNB Resource Coordination Information," including a UL bitmap and a DL bitmap that show MeNB's resource utilization in the time and frequency domains when communicating with a UE. The MeNB then transmits the MeNB Resource Coordination Information to a secondary BS, such as a secondary gNB (SgNB), which uses NR. The SgNB then determines its resource utilization and maps the utilization to the bitmaps received from MeNB by modifying the bitmaps, etc. In certain cases, the MeNB and SgNB are configured to coordinate their resource utilization on a subframe level. However, in LTE Release 15 time resources may be structured differently. More specifically, time resources may be structured as shortened TTIs (sTTIs), which may comprise two types. The first type of sTTI is defined as a slot (also referred to as a slot sTTI), which corresponds to a half-subframe. The second type of sTTI is defined as a sub-slot (also referred to as a sub-slot sTTI). With the use of sTTIs, there is a need for configuring the resource coordination information (e.g., LTE-NR coordination information) for two BSs, which use different RATs, at the sTTI level. Accordingly, certain aspects described herein relate to configuring the resource coordination information at the sTTI level. At the sTTI level, subframe structures, such as LTE-FDD sTTI DL subframe structures, are based on different Control Format Indicator (CFI) values. As such, certain aspects described herein also relate to configuring the resource coordination information such that the resource coordination information is independent of what CFI value is used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the BS 110a, which uses one RAT, has a module for coordinating resource utilization with another BS, such as BS 110b, which uses another RAT, for communication with UE 120a.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
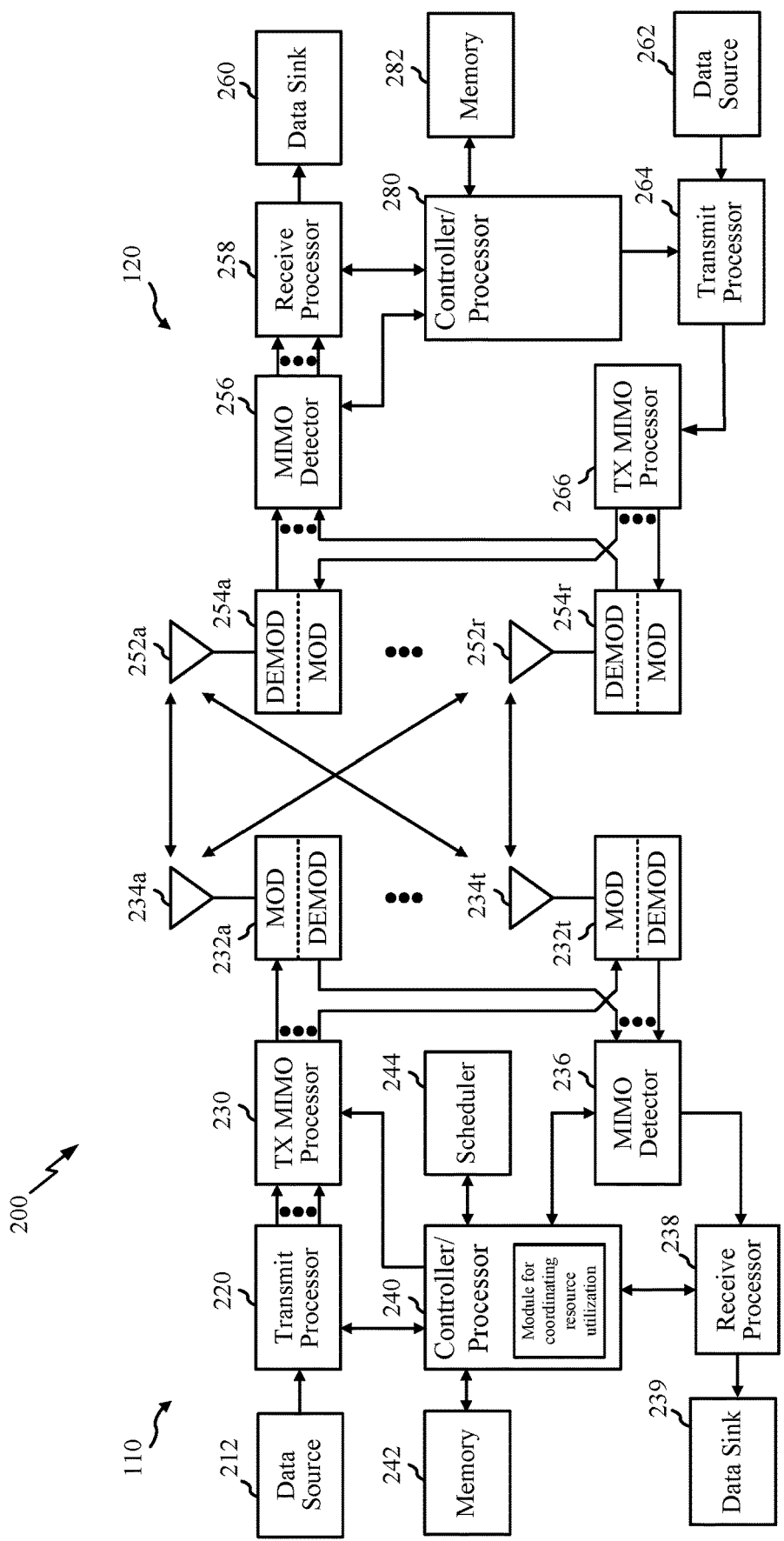
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of BS 110, which uses one RAT, has a module for coordinating resource utilization with another BS, which uses another RAT, for communication with UE 120.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example TDM Coordination for LTE-NR Carrier Aggregation

Wireless communications technologies may enable networks to support wider transmission bandwidths by using carrier aggregation. For example, in certain aspects, a BS (e.g., BS 110) may transmit and/or receive signals on multiple carriers, which may be referred to as component carriers (CCs) using carrier aggregation (CA). Each component carrier used for communication by BSs and UEs (e.g., UE 120) may have a different associated frequency (e.g., center frequency of the component carrier).

In CA, two or more CCs are aggregated in order to increase the transmission bandwidth. A CA-capable UE may, therefore, simultaneously receive or transmit on one or multiple CCs depending on its capabilities. In some cases, CA allows two separate radio access technologies (RATs) to simultaneously communicate with a UE using two different component carriers. For example, a UE may be configured with dual connectivity (e.g., dual transmitter and dual receiver) to simultaneously communicate with a LTE base station as well an NR base station on different carrier frequencies (e.g., CCs).

In some cases, the concurrent communication of the UE with LTE and NR base stations, however, may create interference, even when separate CCs are used for each RAT. For example, with certain frequency band configurations there may be a harmonic relationship between the bands used to aggregate carriers. This harmonic or intermodulation issue may cause sensitivity degradation in the UE, when the UE communicates with both the LTE and the NR base stations concurrently, even when separate CCs are used by each of the RATs.

In some cases, certain techniques can be used for reducing the interference by coordinating the LTE and NR base stations in the time and the frequency domains for communication with a UE. For example, a UE, which is capable of communicating on multiple UL carriers on different frequencies, may be configured to operate on only one of the LTE or NR CCs at any given time. This is a time division multiplex (TDM) solution used for resolving the harmonic issue by allowing only one of the LTE or NR base stations to communicate with the UE at any given time.

In such an example, for the LTE carrier, the UE may be configured with different configurations. The first configuration comprises a DL-reference UL/DL configuration defined for LTE-FDD (frequency division duplex)-SCell (secondary cell) in LTE-TDD (time division duplex)-FDD CA with LTE-TDD-PCell (primary cell). More specifically, for scheduling or HARQ (hybrid automatic repeat request) timing of the LTE FDD carrier, DL-reference UL/DL configuration defined for LTE-FDD-SCell in LTE/TDD-FDD CA with LTE-TDD-PCell is applied. In addition, using the first configuration, the UE is allowed to transmit NR UL signals at least in the subframe(s) where LTE UL transmission is not allowed according to the DL-reference UL/DL configuration. A second configuration, such as described in 3GPP Release 15 based on the LTE-FDD HARQ timing, may also be used. Such configurations, however, are only focused on UL transmission, not DL transmission.

In certain cases, two BSs, such as a MeNB (main eNB, such as the LTE BS) and a SgNB (secondary gNB, such as the NR BS), may use an Addition/Modification Request message of the SgNB to coordinate their resource utilization for communication with a UE. In such cases, if an Addition/Modification Request message of the SgNB contains the MeNB Resource Coordination Information IE (information element), the SgNB may forward it to lower layers for the purpose of resource coordination with the MeNB. Using the Resource Coordination Information IEs, the resource coordination between MeNB and SgNB is performed per UE. In such an example, the MeNB-SgNB coordination may take place in both DL and UL directions.

Figure 3:
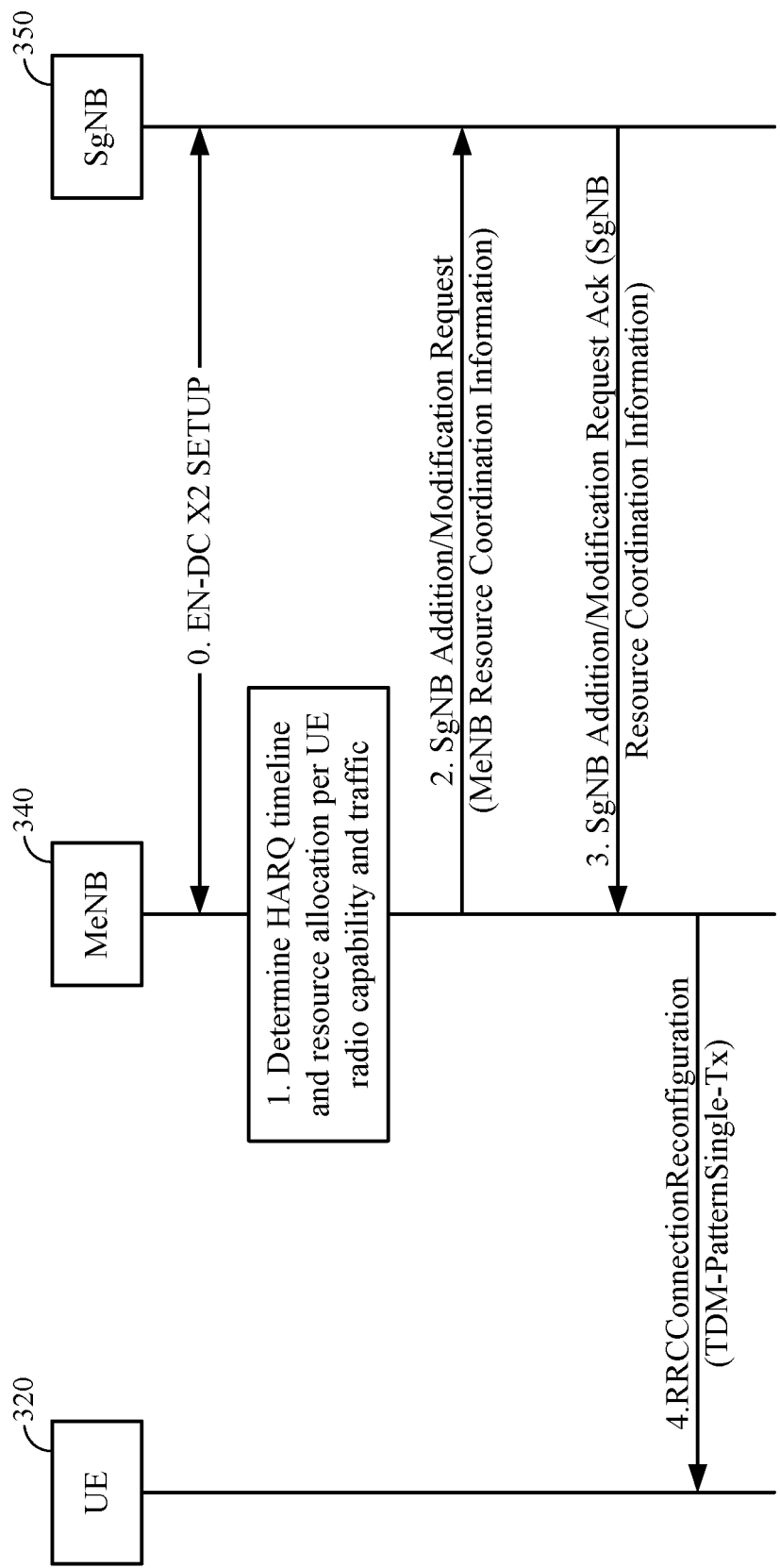
FIG. 3 illustrates an example sequence diagram for resource coordination between two base stations, according to aspects of the present disclosure.

FIG. 3 illustrates an example sequence diagram for resource coordination for a UE 320 between a MeNB 340 and a SgNB 350 using the Addition/Modification Request message. As shown, at step 0 (i.e., 0. EN-DC (E-UTRAN New Radio Dual Connectivity) X2 setup), MeNB 340 and SgNB 350 first exchange configuration information, including carrier frequency, bandwidth and TDD UL/DL configuration. At step 1, the MeNB 340 determines the HARQ timeline and resource allocation on DL and UL for the UE 320 based on the UE 320's radio capability, the configuration of MeNB 340 and/or the configuration of SgNB 350, and network traffic. At least for the harmonic issue described above, the MeNB 340 may be able to determine which PRBs (physical resource blocks) may generate interference to the SgNB 350 DL if used by the UE 320 for transmission. In certain other aspects, only the LTE PCell may be taken into consideration in determining the resource allocation bitmap.

At step 2, the MeNB 340 sends the "MeNB Resource Coordination Information," including a UL bitmap and a DL bitmap to the SgNB 350. The UL/DL resource allocation may take HARQ timeline into consideration. In certain aspects, the SgNB 350 may consider the received UL Coordination Information IE value until reception of a new update of the IE for the same UE 320. In certain aspects, the SgNB 350 considers the received DL Coordination Information IE value until reception of a new update of the IE for the same UE 320.

At step 3, the SgNB 350 determines the SgNB 350 resource allocation and maps the allocation into the MeNB 340 time/frequency bitmap. The SgNB 350 then replies with the SgNB 350 Addition/Modification Request Acknowledge containing SgNB 350 Resource Coordination Information IE to the MeNB 340 for the SgNB 350 resource allocation. At step 4, MeNB 340 sends the HARQ timeline information to the UE 320.

In addition, some aspects relate to adopting a 40-bit TDM coordination pattern bitmap with a 40 millisecond periodicity and 1 millisecond subframe granularity. The 40 millisecond periodicity allows for one transmission and four retransmissions, each with a round-trip time (RTT) of 8 milliseconds (5*8=40). Considering each LTE carrier has up to 110 PRBs in the frequency domain, such a LTE-NR coordination pattern comprises: 40*110=4400 bits. The 40-bit bitmap may be applicable to certain UE configurations described previously. More specifically, for the second UE configuration described above, a 40-bit message or bitmap may be sufficient to allow for four HARQ transmissions (i.e., 8 milliseconds of RTT multiplied by 4). However, a 40-bit bitmap may not be sufficient for some other UE configurations, including the first UE configuration described above, because the TDM pattern periodicity may be more than 40 ms. Note that the first configuration comprises a DL-reference UL/DL configuration defined for LTE-FDD (frequency division duplex)-SCell (secondary cell) in LTE-TDD (time division duplex)-FDD CA with LTE-TDD-PCell (primary cell).

FIG. 4 illustrates an example table 400 including a number of DL-reference UL/DL UE configurations 0-6, for some of which the 40-bit bitmap may not be sufficient. For example, in order to allow four HARQ transmissions over an FDD SCell, in some cases, more than 40 ms may be required for DL-reference UL/DL configuration '4' of table 400.

As described above, MeNB 340 may generate and include a 40-bit UL bitmap and a 40-bit DL bitmap in the MeNB Resource Coordination Information IE, which may be used to coordinate resource utilization between MeNB 340 and SgNB 350. For example, a UL Coordination Information bitmap may comprise a bit string where each position in the string represents a PRB in a subframe. Also value '0' in a bit string of a UL Coordination Information bitmap indicates "resource not intended to be used for transmission," while value '1' indicates "resource intended to be used for transmission." Each position is applicable only in positions corresponding to UL subframes. The bit string may span across multiple contiguous subframes (e.g., maximum 40 bits). As described above, because each LTE carrier has up to 110 PRBs in the frequency domain, each LTE-NR coordination bit map (e.g., UL or DL) may comprise 4400 bits (4*110).

In certain aspects, the first position of the UL Coordination Information bitmap corresponds to subframe 0 in a radio frame where system frame number (SFN)=0. In certain aspects, the length of the bit string is an integer multiple of N (e.g., as defined in TS 36.211 [10]). The UL Coordination Information bitmap is continuously repeated. Also a DL Coordination Information bitmap may comprise a bit string where each bit position in the string represents a PRB in a subframe. Also value '0' in the bit string indicates "resource not intended to be used for transmission," while value '1' indicates "resource intended to be used for transmission." Each position is applicable only in positions corresponding to DL subframes. The bit string may span across multiple contiguous subframes (maximum 40). The first position of the DL Coordination Information bitmap corresponds to the receiving node's subframe 0 in a receiving node's radio frame where SFN=0. The length of the bit string is an integer multiple of $N_{RB}^{DL}$ (e.g., defined in TS 36.211 [10]). The DL Coordination Information is continuously repeated.

Figure 5:
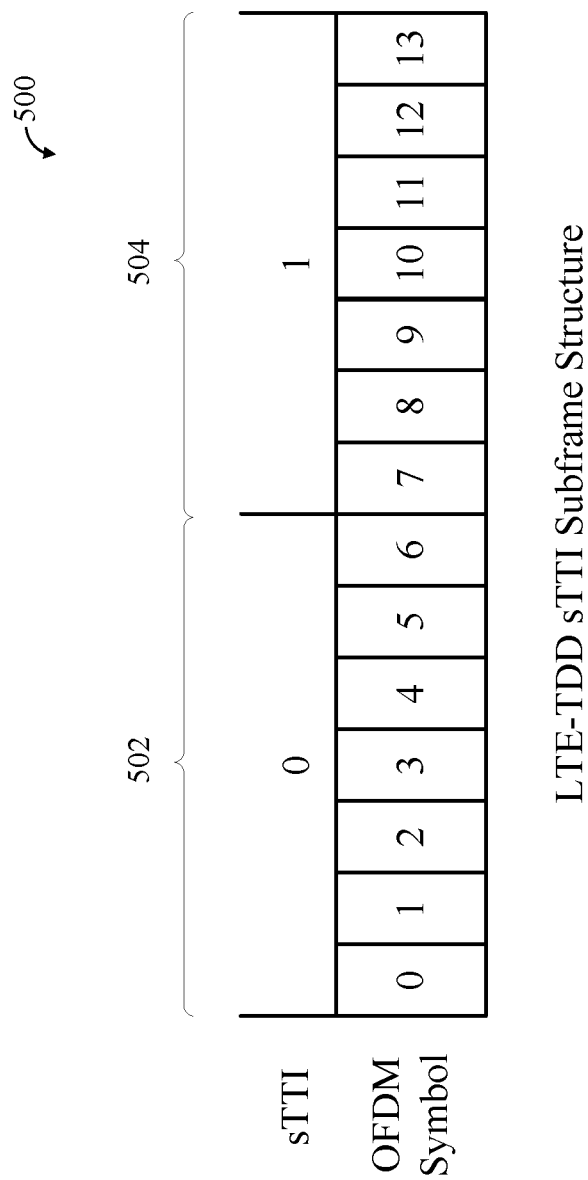
FIG. 5 illustrates an example LTE-TDD (time division duplex) sTTI (shortened transmission time interval) subframe structure comprising two slots, according to aspects of the present disclosure.

Certain aspects herein relate to the use of a shortened TTI (sTTI) (e.g., as defined in LTE Release 15). In certain aspects, there are two types of sTTIs. The first type of a sTTI is defined as a slot (also referred to as a slot sTTI), which corresponds to a half-subframe. FIG. 5 illustrates an example LTE-TDD sTTI subframe structure 500 comprising two slots 502 and 504. Each slot of the subframe corresponds to a sTTI and comprises seven blocks, each block indicating a time symbol.

Figure 6:
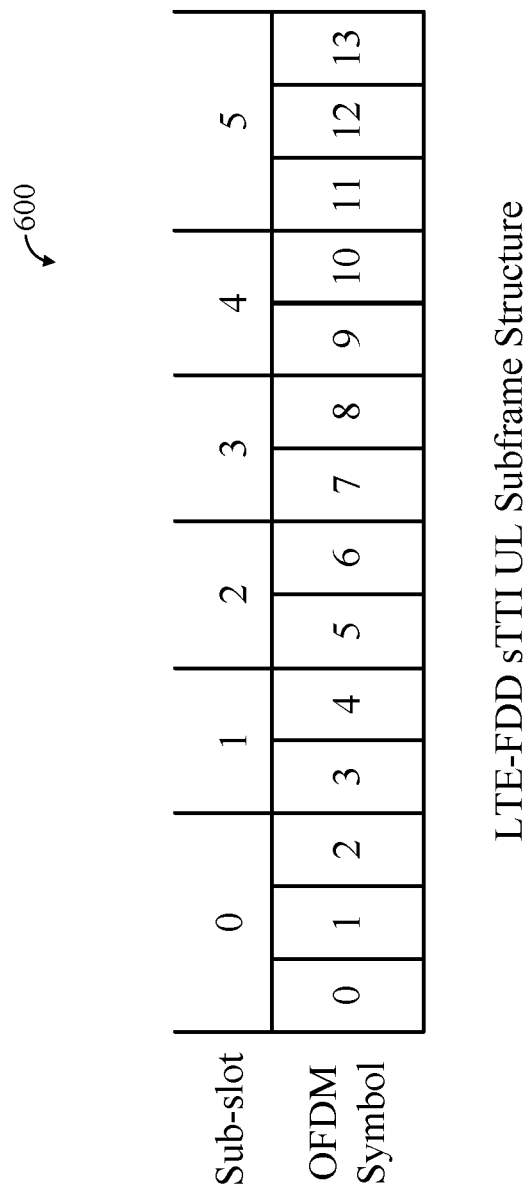
FIG. 6 illustrates an example LTE-FDD sTTI UL (uplink) subframe structure comprising multiple sub-slots, according to aspects of the present disclosure.

The second type of sTTI is defined as a sub-slot (also referred to as a sub-slot sTTI). FIG. 6 illustrates an example LTE-FDD sTTI UL subframe structure 600 comprising multiple sub-slots (sTTI 0, sTTI 1, sTTI 2, sTTI 3, sTTI 4, and sTTI 5) where each sub-slot comprises a number of time symbols.

In certain aspects, an LTE-FDD sTTI UL subframe structure may have three different configurations depending on the Control Format Indicator (CFI) value. In LTE, a CFI value defines the time span, in OFDM symbols, of the Physical Downlink Control Channel (PDCCH) transmission (i.e., the control region) for a particular downlink subframe. The CFI is transmitted using the Physical Control Format Indicator Channel (PCFICH). The CFI is limited to the value 1, 2, or 3. For bandwidths greater than ten resource blocks, the number of OFDM symbols used to contain the downlink control information is the same as the actual CFI value. Otherwise, the span of the downlink control information (DCI) is equal to CFI+1 symbols.

Figure 7A:
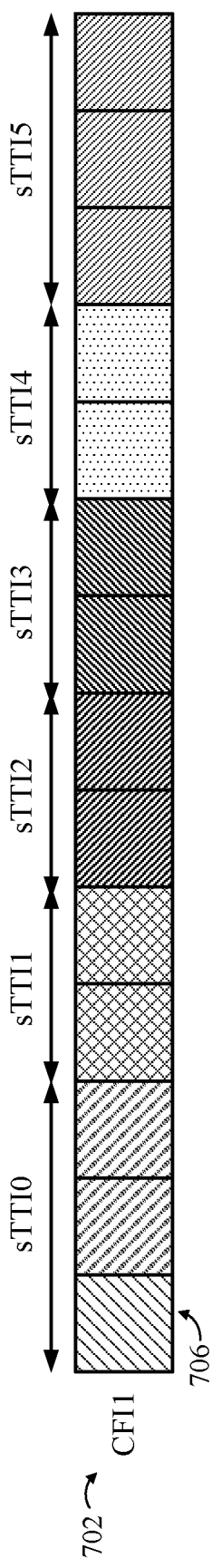
FIGS. 7A-7C illustrate three different LTE-FDD sTTI DL (downlink) subframe structures, each configured based on a different Control Format Indicator (CFI) value, according to aspects of the present disclosure.
Figure 7B:
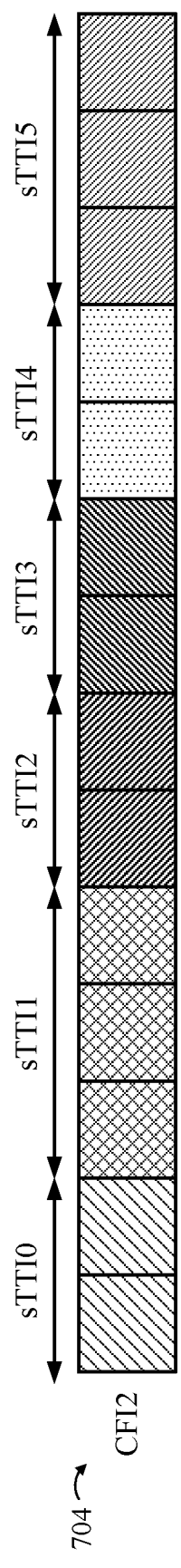
Figure 7C:
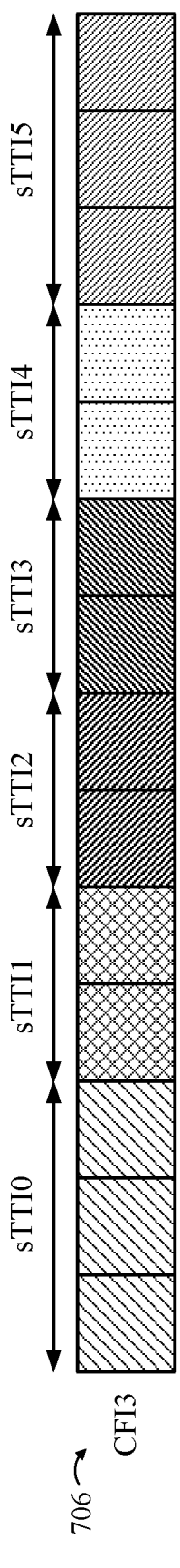

FIGS. 7A-7C illustrate three different LTE-FDD sTTI DL subframe structures 702-706, each configured based on a different CFI value. Each block 706 in each one of structures 702-706 indicates a time symbol. FIG. 7A illustrates LTE-FDD sTTI DL subframe structure 702 when the CFI value is 1. FIG. 7B illustrates LTE-FDD sTTI DL subframe structure 704 when the CFI value is 2. FIG. 7C illustrates LTE-FDD sTTI DL subframe structure 706 when the CFI value is 3.

As described above, the LTE-NR coordination information comprises UL and DL bitmaps for coordinating UL and DL resource utilization between the MeNB (e.g., MeNB 340) and the SgNB (e.g., SgNB 350) at the subframe level. With the use of sTTIs, however, there is a need for configuring the LTE-NR coordination information at the sTTI level. Accordingly, certain aspects described below relate to configuring the LTE-NR coordination information at the sTTI level.

Figure 8:
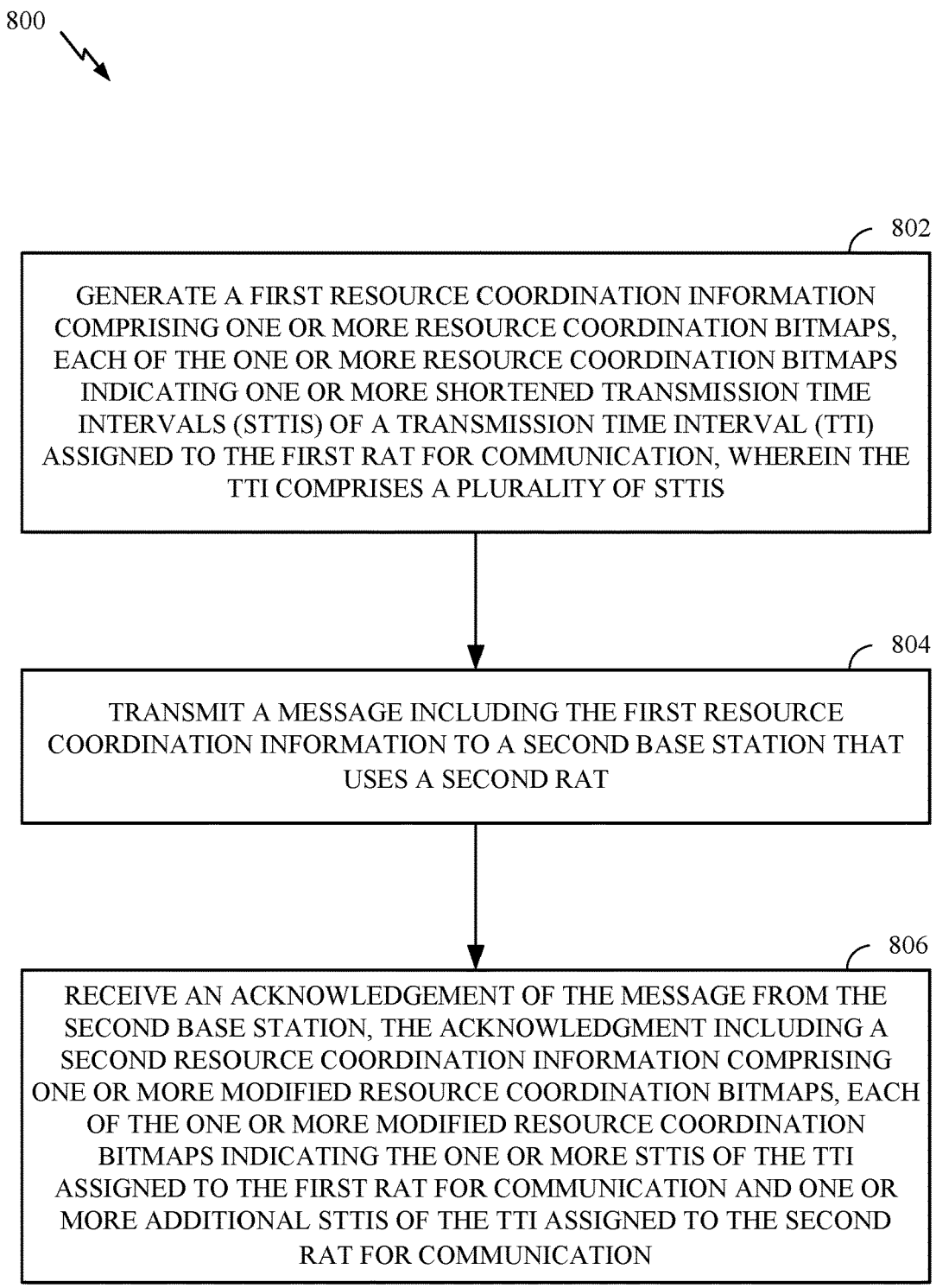
FIG. 8 illustrates example operations performed by a first base station that uses a first radio access technology (RAT), according to aspects of the present disclosure.

FIG. 8 illustrates example operations 800 performed by a first base station that uses a first radio access technology (RAT), according to aspects of the present disclosure. Operations 800 begin, at 802, by generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs.

At 804, operations 800 continue by transmitting a message including the first resource coordination information to a second base station that uses a second RAT.

At 806, operations 800 receiving an acknowledgement of the message from the second base station, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

For a slot sTTI, the timeline may be n+4, where n stands for the number of transmissions and '4' stands of the number of retransmissions for each transmission. Accordingly, for example, a 40-bit (8*5) message may be used to account for up to four retransmissions for each LTE HARQ process. In such an example, the number '8' indicates 8 ms of RTT and the number '5' indicates the number of transmissions (i.e., one transmission and four retransmissions). In some embodiments, assuming a 40-bit IE is sufficient for a 1ms "TTI+NR coordination," the same number of bits may be sufficient for a slot sTTI and NR coordination. In NR, each radio frame has 20 slots, but the timeline is half of that of the legacy LTE. Therefore, a 40-bit coordination message with the periodicity of 20 ms may be used for subframe structures having slot sTTIs (e.g., shown in FIG. 9).

For a sub-slot sTTI, however, the DL subframe structure, as described above, may be a function of the CFI value. Therefore, at the sTTI level, TDM coordination may be challenging because the DL subframe structure may change dynamically based on the CFI value, while the LTE-NR coordination information is exchanged semi-statically. As a result, certain embodiments described herein relate to configuring the LTE-NR coordination information such that it is independent of what CFI value is used for DL subframes. In some embodiments, in order to configure an LTE-NR coordination information that is independent of CFI values, a common TDM coordination pattern may be used for all types of DL subframe structures, regardless of the CFI value. For example, in some embodiments, the LTE and NR base stations may be configured such that the first three symbols of the DL subframe structure may be used for LTE transmissions. In such embodiments, no bit indication may be needed in the DL LTE-NR coordination information bitmap to indicate that the first three symbols of each DL subframe shall be used for LTE transmissions. In addition, in some embodiments, when the CFI value is 1 or 3, all the "sTTI 1" symbols of each DL subframe, may be used for NR DL transmissions, and when the CFI value is 2, only the last 2 symbols of "sTTI 1" may be used for NR DL transmissions. As shown in FIGS. 7A-7C, starting from "sTTI 2," the TDM patterns of all the DL subframe structures are aligned. Accordingly, for each of sTTI2, sTTI3, sTTI4, and sTTI5, a bit in a LTE-NR coordination information bitmap may be used to indicate the time domain resource allocation.

In some embodiments, in one cell, sTTI users (e.g., UEs) may be configured with an n+4, n+6, or n+8 timeline. Therefore, in order to make the TDM pattern generally applicable to both types of sTTI (i.e., slot sTTI and sub-slot sTTI), an 80-bit TDM pattern ('16' ms (i.e., RTT) multiplied by '5' (i.e., one transmission plus four retransmissions))=80 bits) may be used for sub-slot TTI+NR coordination. In some embodiments, in the DL LTE-NR coordination information bitmap, 5 bits may be used per subframe (1 bit per usable sTTI for NR). Accordingly, in order to make the TDM pattern radio frame-aligned, 400 bits (80*5) may be used in the time domain. In some embodiments, in each cell, the UE uses only one TTI type. This is because the coordination periodicity is common in Case 1 and 2 (e.g., Case 1 and 2 are RAN1 terminology). In addition, the sTTI type is determined by the PUCCH group. Accordingly, as each cell belongs to only one PUCCH group for a UE, in each cell, the UE uses only one TTI type.

In some embodiments, several different techniques may be used to enable the exchange of the sTTI-level LTE-NR coordination information between the MeNB and SgNB.

One technique, in some embodiments, may comprise adding an optional "TTI type" to the Resource Coordination Information IEs comprising the LTE-NR coordination information. For example, a TTI type may be added to the MeNB Resource Coordination Information IE and the SgNB Resource Coordination Information exchanged between the MeNB and SgNB for EN-DC. In some embodiments, equivalent IEs may be used for F1AP (F1-Application Protocol) and XnAP (Xn Application Protocol). In some embodiments, a time domain length of 40 bits may be used for the Resource Coordination IEs. In some embodiments, the time domain length of the Resource Coordination IEs may be extended to 80 bits. In some embodiments, if a UE is not configured with sTTI (including slot TTI) in the cell, the NR BS (e.g., SgNB, gNB, etc.) and the LTE BS (e.g., MeNB, eNB, etc.) may assume that the TTI type is subframe. If the TTI type is not included, in some embodiments, the SgNB and the MeNB may assume that the TTI type is the type that the RRC has configured for the UE.

Figure 9:
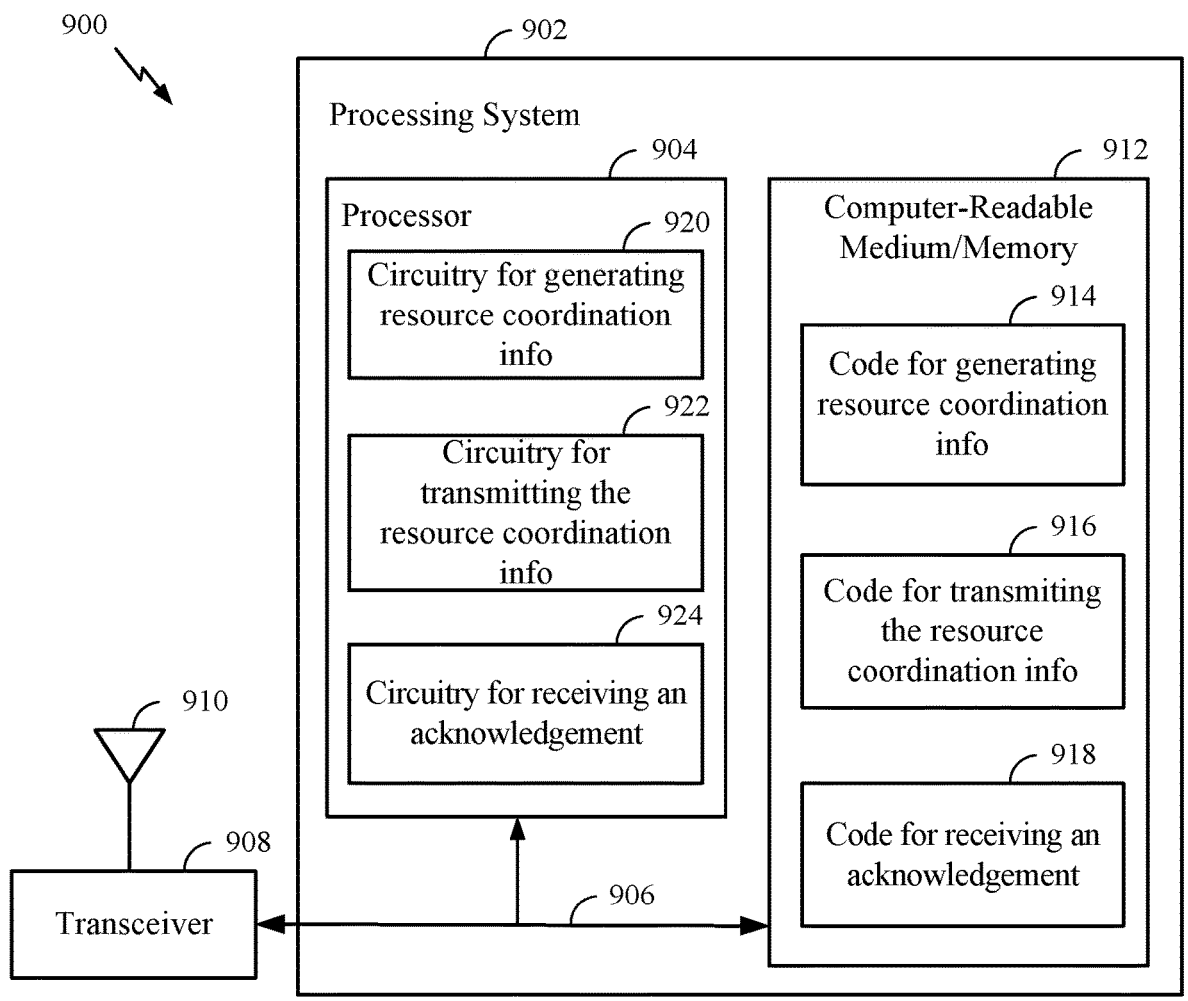
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 8, or other operations for performing the various techniques discussed herein relating to performing TDM coordination for LTE-NR CA. In certain aspects, computer-readable medium/memory 912 stores code 914 that, when executed by processor 904, causes communications device 900 to perform block 802 of operation 800. In certain aspects, computer-readable medium/memory 912 stores code 916 that, when executed by processor 904, causes communications device 900 to perform block 804 of operation 800. In certain aspects, computer-readable medium/memory 912 stores code 918 that, when executed by processor 904, causes communications device 900 to perform block 806 of operation 800.

In certain aspects, the processor 904 has circuitry configured to implement the code stored in the computer-readable medium/memory 912. The processor 1004 includes circuitry 920 for performing code 914, circuitry 922 for performing code 916, and circuitry 924 for performing code 918.

FIG. 10 illustrates an example table 1000 comprising a number of fields representative of the type of information included in a Resource Coordination IE that comprises a TTI type. The fields of the table include IE/Group Name 1002, Presence 1004, Range 1006, IE Type and Reference 1008, and Semantics Description 1010 (e.g., information used to coordinate resource utilization between the MeNB and the SgNB). As shown, the TTI type may be added as an "IE/Group Name" under field 1002. In the IE Type and Reference field 1008, the specific TTI type of the subframe structure may be indicated. For example, the TTI type may be either one of five types of TTIs including sTTI CFI 1, sTTI CFI 2, sTTI CFI 3, a slot TTI, or a subframe TTI. Considering each LTE carrier has up to 110 PRBs in the frequency domain, each LTE-NR coordination information bitmap (e.g., UL or DL) may comprise 8800 bits (80 bits*110 PRBs) when the bitmap is extended to 80 bits.

Relating to the UL Coordination Information under the IE/Group Name field 1002, which is added as another "IE/Group Name," each position in the bitmap represents a PRB in a TTI as indicated by TTI type. The UL Coordination Information may further state that value '0' indicates a resource not intended to be used for transmission while value '1' indicates a resource intended to be used for transmission. Each position is applicable only in positions corresponding to UL TTIs. The bit string may span across multiple contiguous TTIs (maximum 80). In certain aspects, the first position of the UL Coordination Information corresponds to subframe 0 in a radio frame where SFN=0. In certain aspects, the length of the bit string is an integer multiple of $N_{RB}^{UL}$. In certain aspects, the UL Coordination Information is continuously repeated.

Relating to the DL Coordination Information, under the IE/Group Name field 1002, which is added as another "IE/Group Name," each position in the bitmap represents a PRB in a TTI as indicated by TTI type. Value '0' indicates a "resource not intended to be used for transmission" while value '1' indicates a "resource intended to be used for transmission." Each position is applicable only in positions corresponding to DL TTIs. The bit string may span across multiple contiguous TTIs (maximum 80 bits). In certain aspects, the first position of the DL Coordination Information corresponds to the receiving node's subframe '0' in a receiving node's radio frame where SFN=0. In certain aspects, the length of the bit string is an integer multiple of $N_{RB}^{DL}$. $N_{RB}^{DL}$, such as defined in TS 36.211 [10]. In certain aspects, the DL Coordination Information is continuously repeated.

Instead of using the same IE for both TDM and FDM coordination, another technique, in some embodiments, may comprise generating or adding separate TDM and FDM IEs for the resource coordination. The eNB and the gNB may exchange the sub-slot level TDM coordination bitmap, e.g., a sub-slot pattern. In some embodiments, the LTE PRBs reserved for sTTIs are indicated to the gNB. In some cases, the UE may be configured for using sTTIs and also regular TTIs (e.g., subframes) in parallel. In such cases, the existing subframe-level (e.g., subframe*PRB) bitmap may be used for regular TTIs. In some embodiments, a sub-slot pattern as well as sTTI PRBs may be added into the MeNB Resource Coordination Information and the SgNB Resource Coordination Information.

FIG. 11 illustrates separate TDM and FDM IEs that may be included in, for example, the Resource Coordination Information 1100. More specifically, FIG. 11 shows MeNB Resource Coordination Information 1100, comprising a TDM IE 1102 and an FDM IE 1104. Similar information (e.g., information included in Resource Coordination Information 1100) may also be added to the SgNB Resource Coordination Information. In TDM IE 1102, a bit string (e.g., 80 bits) may be added to indicate the UL sTTI structure pattern and another bit string may be added to indicate the DL sTTI structure pattern. In FDM IE 1104, another bit string may be added to indicate the LTE sTTI PRB pattern.

In some embodiments, another technique may comprise extending the MeNB Resource Coordination Information and the SgNB Resource Coordination Information to the sub-slot level. In such embodiments, the same IE may be used for TDM (time domain) and the FDM (frequency domain) resource allocation. In such embodiments, instead of using a 6~40*110 bitmap, a 6~5*40*110 UL bitmap and a 6~5*40*110 DL bitmap may be used for coordinating UL and DL resource utilization between the MeNB and the SgNB at the sTTI/slot level. In such embodiments, the bit string may comprise 22000 bits (5*40*110). As described above, each bitmap may allocate 5 bits to each subframe for indicating the sTTI resource allocation. As also described above, the first sub-slot may be used by LTE.

In some embodiments, sTTI may not be used in the UL and DL subframe structures. In such embodiments, as described above, the TDM time granularity is in the subframe level. In such embodiments, if the LTE-NR frame boundaries are not aligned, part of a subframe may be wasted in each LTE-NR switching point.

Figure 12:
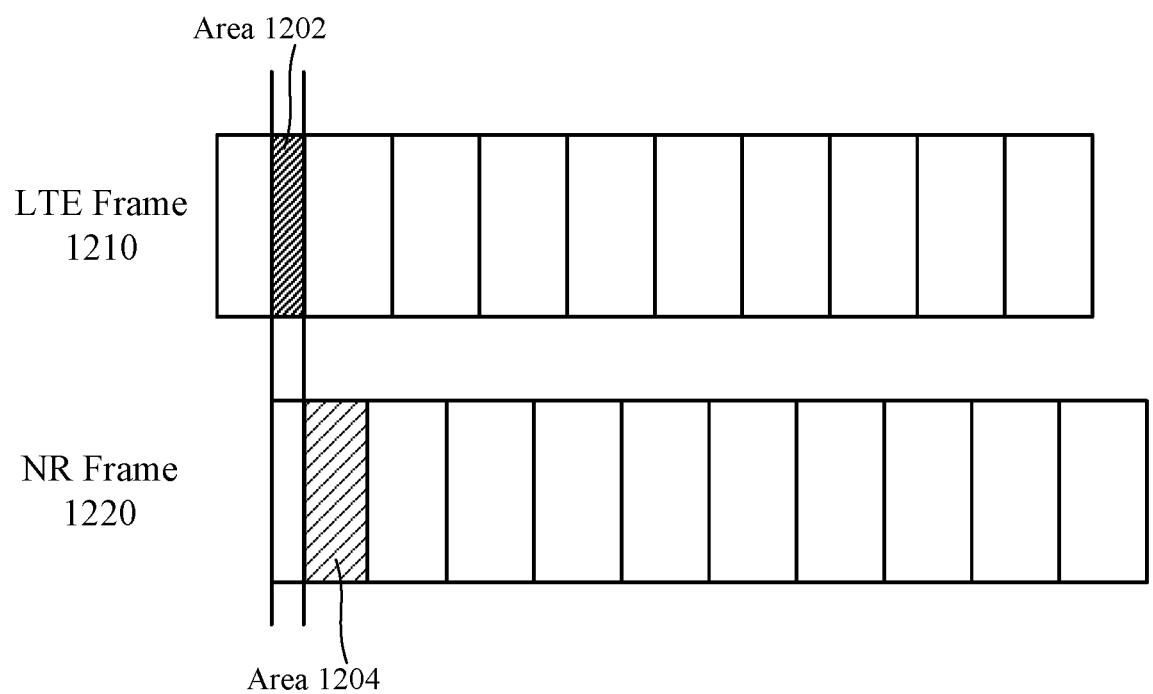
FIG. 12 illustrates an example LTE frame and an example NR frame that are not aligned.

FIG. 12 illustrates an example LTE frame 1210 and an example NR frame 1220 that are not aligned. In the example of FIG. 12, area 1202 of the LTE frame 1210 or area 1204 of the NR frame 1220 may be wasted in each LTE-NR switching point. Accordingly, certain embodiments described herein relate to handling the partial overlapping of LTE-NR subframes. In some embodiments, the MeNB and the SgNB may coordinate which RAT has a high priority in the partially overlapped subframe. For example, the MeNB and the SgNB may exchange the RAT priority over X2/Xn.

By default (e.g., without explicit indication), in some embodiments, the LTE BS may have the higher priority, at least in MR-DC cases where LTE eNB is the master node. In some embodiments, without any explicit indication, the master node may be the high priority RAT. In some embodiments, the low priority RAT may not use the overlapped partial subframe. The LTE-NR timing may be carried in SCG-ConfigInfo as measResultSSTD.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications performed by a first base station that uses a first radio access technology (RAT), the method comprising:
   generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs;
   transmitting a message including the first resource coordination information to a second base station that uses a second RAT; and
   receiving an acknowledgement of the message from the second base station, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

2. The method of claim 1, wherein the modified one or more resource coordination bitmaps comprise a downlink (DL) resource coordination bitmap, wherein the DL resource coordination bitmap comprises a plurality of bits that indicate assignment of sTTIs of the TTI to the first base station and the second base station, wherein a number of the plurality of bits is less than a number of the plurality of sTTIs in the TTI.

3. The method of claim 2, wherein the TTI is one of a plurality of types of TTIs based on a control format indicator (CFI), wherein each type of TTI comprises a different arrangement of sTTIs, and wherein a first three symbols of each of the plurality of types of TTIs are allocated for use by the first RAT.

4. The method of claim 3, wherein the plurality of bits does not explicitly indicate allocation of the first three symbols of the TTI.

5. The method of claim 3, wherein the CFI value is 2, wherein a second sTTI in order of the plurality of sTTIs in the TTI comprises three symbols, wherein the last two symbols of the second sTTI are allocated for use in DL transmission by the second base station, and wherein 1 bit of the plurality of bits indicates that the last two symbols of the second sTTI are allocated for use in DL transmission by the second base station.

6. The method of claim 3, wherein the CFI value is 1 or 3, wherein a first sTTI in order of the plurality of sTTIs in the TTI comprises two symbols, and wherein the two symbols of the first sTTI of the TTI are allocated for use in DL transmission by the second base station, and wherein 1 bit is used by the DL resource coordination bitmap for the TTI to indicate that the last two symbols of the first sTTI are allocated for use in DL transmission by the second base station.

7. The method of claim 6, wherein a pattern of each one of a second sTTI, a third sTTI, a fourth sTTI, and a fifth sTTI does not vary based on the CFI value, and wherein 4 bits are used by the DL resource coordination bitmap for each TTI to indicate resource allocation for the second sTTI, the third sTTI, the fourth sTTI, and the fifth sTTI.

8. The method of claim 1, further comprising:
determining a type of the TTI that the UE is configured with, prior to determining uplink (UL) and downlink (DL) resource allocation; and
indicating the type of TTI in the first resource coordination information.

9. The method of claim 1, wherein the type of TTI indicates at least one of a slot-level sTTI, a sub-slot-level sTTI, or a subframe TTI.

10. The method of claim 1, wherein each of the first resource coordination information and the second resource coordination information comprises an UL time division multiplexing (TDM) bitmap and a DL time division multiplexing (TDM) bitmap for coordinating time resources between the first base station and the second base station.

11. The method of claim 1, wherein each of the first resource coordination information and the second resource coordination information comprises a frequency division multiplexing (FDM) bitmap for coordinating frequency resources between the first base station and the second base station.

12. The method of claim 1, wherein the TTI is a subframe, wherein each sTTI of the one or more sTTIs in the TTI corresponds to a sub-slot of the TTI, wherein each bit in each of the one or more bitmaps corresponds to a sTTI of the TTI, and wherein each of the one or more bitmaps comprises 22000 bits of information.

13. The method of claim 1, further comprising: exchanging a RAT priority information with the second base station.

14. The method of claim 13, wherein the RAT priority information indicates a priority of the first base station in using time and frequency resources.

15. A first apparatus, comprising:
a processor; and
a memory, wherein the memory includes a program executable in the processor to cause the first apparatus which uses a first radio access technology (RAT) to perform operations comprising:
generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs;
transmitting a message including the first resource coordination information to a second apparatus that uses a second RAT; and
receiving an acknowledgement of the message from the second apparatus, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

16. The first apparatus of claim 15, wherein the modified one or more resource coordination bitmaps comprise a downlink (DL) resource coordination bitmap, wherein the DL resource coordination bitmap comprises a plurality of bits that indicate assignment of sTTIs of the TTI to the first apparatus and the second apparatus, wherein a number of the plurality of bits is less than a number of the plurality of sTTIs in the TTI.

17. The first apparatus of claim 16, wherein the TTI is one of a plurality of types of TTIs based on a control format indicator (CFI), wherein each type of TTI comprises a different arrangement of sTTIs, and wherein a first three symbols of each of the plurality of types of TTIs are allocated for use by the first RAT.

18. The first apparatus of claim 17, wherein the plurality of bits does not explicitly indicate allocation of the first three symbols of the TTI.

19. The first apparatus of claim 17, wherein the CFI value is 2, wherein a second sTTI in order of the plurality of sTTIs in the TTI comprises three symbols, wherein the last two symbols of the second sTTI are allocated for use in DL transmission by the second apparatus, and wherein 1 bit of the plurality of bits indicates that the last two symbols of the second sTTI are allocated for use in DL transmission by the second apparatus.

20. The first apparatus of claim 17, wherein the CFI value is 1 or 3, wherein a first sTTI in order of the plurality of sTTIs in the TTI comprises two symbols, and wherein the two symbols of the first sTTI of the TTI are allocated for use in DL transmission by the second apparatus, and wherein 1 bit is used by the DL resource coordination bitmap for the TTI to indicate that the last two symbols of the first sTTI are allocated for use in DL transmission by the second apparatus.

21. The first apparatus of claim 20, wherein a pattern of each one of a second sTTI, a third sTTI, a fourth sTTI, and a fifth sTTI does not vary based on the CFI value, and wherein 4 bits are used by the DL resource coordination bitmap for each TTI to indicate resource allocation for the second sTTI, the third sTTI, the fourth sTTI, and the fifth sTTI.

22. The first apparatus of claim 15, wherein the operations further comprise:
   determining a type of the TTI that the UE is configured with, prior to determining uplink (UL) and downlink (DL) resource allocation; and
   indicating the type of TTI in the first resource coordination information.

23. The first apparatus of claim 15, wherein the type of TTI indicates at least one of a slot-level sTTI, a sub-slot-level sTTI, or a subframe TTI.

24. The first apparatus of claim 15, wherein each of the first resource coordination information and the second resource coordination information comprises an UL time division multiplexing (TDM) bitmap and a DL time division multiplexing (TDM) bitmap for coordinating time resources between the first apparatus and the second apparatus.

25. The first apparatus of claim 15, wherein each of the first resource coordination information and the second resource coordination information comprises a frequency division multiplexing (FDM) bitmap for coordinating frequency resources between the first apparatus and the second apparatus.

26. The first apparatus of claim 15, wherein the TTI is a subframe, wherein each sTTI of the one or more sTTIs in the TTI corresponds to a sub-slot of the TTI, wherein each bit in each of the one or more bitmaps corresponds to a sTTI of the TTI, and wherein each of the one or more bitmaps comprises 22000 bits of information.

27. The first apparatus of claim 15, wherein the operations further comprise exchanging a RAT priority information with the second apparatus.

28. The first apparatus of claim 27, wherein the RAT priority information indicates a priority of the first apparatus in using time and frequency resources.

29. A first apparatus, comprising:
   means for generating a first resource coordination information comprising one or more resource coordination bitmaps, each of the one or more resource coordination bitmaps indicating one or more shortened transmission time intervals (sTTIs) of a transmission time interval (TTI) assigned to the first RAT for communication, wherein the TTI comprises a plurality of sTTIs;
   means for transmitting a message including the first resource coordination information to a second apparatus that uses a second RAT; and
   means for receiving an acknowledgement of the message from the second apparatus, the acknowledgment including a second resource coordination information comprising one or more modified resource coordination bitmaps, each of the one or more modified resource coordination bitmaps indicating the one or more sTTIs of the TTI assigned to the first RAT for communication and one or more additional sTTIs of the TTI assigned to the second RAT for communication.

* * * * *